Patented Sept. 19, 1950

2,522,548

UNITED STATES PATENT OFFICE 2,522,548

METHOD OF MAKING A PHOSPHATE GEL AND MOLD WITH PHOSPHATE GEL BINDER

Johann S. Streicher, East Orange, N. J., assignor to Thoger G. Jungersen, Summit, N. J.

No Drawing. Application October 3, 1946, Serial No. 701,063

27 Claims. (Cl. 22—188)

1

The present invention relates to a new phosphate gel especially suitable as an investment binder and a casting process employing the same.

More particularly the present invention relates to investment materials including as a binder a novel complex phosphate gel which is unreactive in the presence of metals, and more particularly unreactive to metals in a molten state at a relatively high temperature. The present investment materials are particularly desirable for the manufacture of refractory molds for the casting therein of metals into objects having a predetermined size and shape, and especially for the casting of metals not only of the relatively low melting type such as aluminum and its alloys, copper, silver, gold and their alloys, but particularly for the casting of metals and alloys belonging to group 8 of the periodic system, such as iron, nickel, cobalt, palladium, platinum and their alloys. The molds into which these high melting metals and alloys are cast must not only possess a high degree of mechanical strength, but also must be incapable of decomposition or reaction with these metals at the relatively high temperatures employed for casting them.

The present invention in particular is directed to precision casting of these metals employing in general the process set forth in U. S. Patents 2,118,468, granted May 24, 1938, to Thoger G. Jungersen; 2,200,449, granted May 14, 1940, to Thoger G. Jungersen; and 2,201,131, granted May 14, 1940, to Thoger G. Jungersen. The present invention in particular is directed to precision casting of these metals as set forth in U. S. Patents 2,118,468, 2,200,449 and 2,201,131. In these precision casting processes a plaster of Paris mixture with quartz or crystobalite or both is used either as a primary or as a secondary investment. Gypsum gel structures act or serve as binder for the silica filler. On slowly heating these investments the water which has been sorbed by the gypsum gel during setting is slowly driven off leaving the gypsum binder in the form of highly porous gel skeleton consisting of hydrated gypsum. On further heating the investment and by slowly raising the temperature to about 200 degrees C. (about 400 degrees F.) the hydrated gypsum is gradually transformed into calcined gypsum ($CaSO_4 \cdot \frac{1}{2}H_2O$). By still further raising the temperature to about 500° C. (930° F.) the calcined calcium sulfate is transformed into the completely dehydrated compound known as the nonreactive gypsum. At present gypsum-bonded investments are generally considered the best investments serving the art of precision casting.

2

However, their use is limited to metals and alloys melting not higher than about 1,000 to 1,100° C. (about 1,800 to 2,000° F.). This limited use of gypsum-bonded investments is due to the fact that at this temperature range calcium sulfate as a chemical compound begins to break down. During this breakdown sulfur compounds are formed. These sulfur compounds react chemically with most of the hot metals, thus forming badly corroded and irregular surfaces. The silica flour of the investment enhances the break-down of the calcium sulfate to such a degree that the complete destruction of the binder is effected at a temperature of 1,250° C. (2,280° F.), and above. Therefore, any metal melting at and above 1,250° C. locally produces this sudden break-down of the gypsum binder and destroys the gypsum-bonded investment.

Many efforts have been made to replace gypsum-bonded investments by investments having improved refractory properties. Investments have been suggested having hydrated silica gel as binder. Silica-gel-bonded investments are well known for their refractory properties and the good surfaces produced by them in the precision casting procedures. However, the silica-gel-bonded investments have the disadvantage that no method has been found to produce the silica gel binder from various silica compounds within reasonable time after pouring the investment, and in such a manner that the binder always develops sufficient activity to effect the setting of the investment at least within a few hours. Besides, the slowly setting silica-gel binder is always of a type that shrinks during setting. For these reasons the investments tend to develop a number of defects causing fractures in the burnt out investments.

It has been found, in accordance with the present invention, that investments may be produced comprising the generally used fillers for investments bonded together with a network of phosphate gel structures having not only practically identical bonding properties with the gypsum-gel structures, but also very similar properties with regard to dehydration on heating. The resulting dehydrated phosphate gel structures have, however, a greater physical and chemical stability than the dehydrated gypsum gel structures. The investments thus obtained have, therefore, highly improved refractory properties towards molten metals and alloys melting at and above 1,100° C.

As previously pointed out, metals falling within this category are metals of group 8 of the periodic table including platinum, iron, etc., together with their alloys.

It has been found in accordance with the present invention that phosphate gel binders sorbing chemically or otherwise very large amounts of water within a relatively short time are produced by reacting metal oxides or hydroxides capable of forming insoluble secondary and tertiary phosphates with primary phosphate solutions having a relatively high absolute concentration and containing at least one primary metal phosphate capable of forming insoluble secondary and tertiary phosphates, and, besides, at least one primary alkali metal phosphate.

It is desired to point out that the primary ammonium phosphate is not ordinarily considered an alkali metal phosphate and is not effective in the process of the present invention.

According to this method phosphate gel structures having a great power of sorbing water are best produced by reacting primary metal phosphate solutions having a total phosphoric acid content varying from about 2 to about 25%. For the manufacture of the phosphate gel structures developing maximum power of sorbing water the most suitable solutions are those with a total phosphoric acid content varying from about 7 to about 20%. However, the formation of a phosphate precipitate having the properties of forming a gel structure sorbing not only substantial but very large amounts of water shortly after its formation is, as tests revealed, not only dependent upon the total phosphoric acid content of a reacting solution, but it is foremost dependent upon the type of the primary metal phosphates present. For instance, by reacting primary alkali-metal phosphates with oxides or hydroxides forming insoluble secondary and tertiary phosphates no phosphate gel structures are formed; the precipitates thus formed are predominantly of the crystalline type, or very close to it. These crystalline precipitates sorb only minor amounts of water the moment they are formed; however, they lack the ability of sorbing substantial amounts of water after they have formed.

Crystalline compounds of the character just described cannot produce a substantial setting action when utilized in an investment. Secondary and tertiary alkali metal phosphates in solution also do not produce the proper gel compounds when reacted with oxides or hydroxides of the character just set forth, and the formation of crystalline compounds is also observed when solutions produced by transforming secondary or tertiary alkali metal phosphates into primary phosphate solutions by the addition of phosphoric acid are used. As previously pointed out, the solution which is reacted with the precipitant, i. e. the oxide or hydroxide, must contain in addition to the primary alkali metal phosphate a second primary phosphate which is selected from the group of metals capable of forming insoluble secondary or tertiary phosphate. Preferably phosphate gel structures having a great absorbing power for water shortly after they are formed within a liquid or solid-liquid system are with the greatest ease produced by reacting solutions having between about one-third ($\frac{1}{3}$) to about two-thirds ($\frac{2}{3}$) of their total phosphoric acid content in the form of a primary metal phosphate from the metal group forming insoluble secondary and tertiary phosphates, and from about two-thirds ($\frac{2}{3}$) to about one-third ($\frac{1}{3}$) of the total phosphoric acid content in the form of a primary alkali metal phosphate. Solutions of this type have a pH value varying between about $pH_3$ and $pH_4$; the $pH_3$ indicates that the solutions contain minor amounts of free phosphoric acid (from about 0.3 to 2.0 grams per liter), and $pH_4$ indicates minor amounts of secondary alkali metal phosphate aside from the primary phosphates. By reacting these solutions with the metal oxides or hydroxides producing the phosphate precipitates a relatively rapid increase in the pH value is observed; within about two minutes the pH value changes from $pH_3$ to $pH_6$, and within the third and fourth minute to $pH_7$, respectively, to $pH_8$. This rapid change in the pH value indicates the extremely rapid precipitation of the phosphate gel structures throughout the mixture. It was found that the phosphate gel structures developing maximum sorbing power towards water are those which appear regularly and suddenly after an inception period of about thirty seconds. The pH value of the reacting mass has at this point changed to the $pH_6$ value. From now on the newly formed gel structures start eagerly to sorb water; they are practically completely saturated after about 15 to 60 minutes. Their power of sorbing water is such that one (1) gram phosphoric acid transformed in the above manner into phosphate gel structures is able to hold from about seven (7) to about fifteen (15) milliliters water and even more.

It was found that, due to this most extraordinary power of sorbing water the phosphate gel structures and the gels produced through the above procedure are most useful in the manufacture of investments required for the precision casting procedures. It was found that they produce not only a most efficient "set" with any investment material (filler), but they are in their dehydrated state most efficacious as a binder. With regard to the faculty of serving as a setting-up agent and as a binder agent these phosphate gel structures were found as useful as the well-known plaster of Paris binder. The phosphate gels release the sorbed water practically as easily as the gypsum gels when heated to about 50 to 100° C.; the resulting dehydrated, extremely porous skeleton acts as an excellent cement for any type of filler material. The phosphate gels do not shrink during dehydration. The resulting dehydrated gel structures stand further heating especially within the heating ranges required for the burning out of the wax. However, in contrast to the gypsum gel structures the new phosphate gel structures are non-reactive towards molten metals, especially towards the high melting metals and alloys belonging to group 8 of the periodic system, such as iron, nickel, cobalt, palladium, platinum and their alloys.

The new phosphate gel structures produce the binder effect required for the investment materials (inorganic mineral fillers) used in the art of precision casting when used in amounts from at least about 2% and more phosphoric acid content calculated on weight of dehydrated investment, and in some instances as high as 25%. With the standard investment mixtures consisting of standard refractory materials and having apparent densities from about 1.35 to about 1.70 (such as silica flour in its three principal modifications, mixed with silica sand, alumina, kaolin, feldspar and others) maximum mechanical strength is attained by incorporating the phosphate gel binder in amounts equivalent to about 3 to 8% phosphoric acid, calculated on weight of dehydrated investment. By incorporating into the above investment materials such extremely light weight materials as celite, kieselguhr, dehydrated silica gel etc., the apparent densities of these mixtures decrease due to the extraordinary small apparent densities of these substances. Such light-weight investment materials can be as well bonded with the new phosphate gel binder as the standard refractory materials. Preferably with these light weight fillers more binder is used than the standard refractory materials calculated on the basis of weight; the binder being preferably increased in proportion to the decrease of the apparent densities of the mixture. Up to about 20 to 25% phosphoric acid (calculated on weight of dehydrated investment) may be used for these light fillers. For instance, in an investment where the filler is largely celite (apparent density 0.34) it is desirable to use compounds of approximately 20% phosphoric acid to produce proper bonding and sufficient mechanical strength.

Standard refractory materials are best bonded with the new phosphate gel binder by using a water/powder (W/P) ratio varying from about 0.30 to about 0.60, that is, about 30 to 60 milliliters water per 100 grams powder mixture, the lower ratios applying to investments containing about 3 to 5% phosphoric acid, and the higher water/powder ratios applying to investments containing from about 5 to 8% phosphoric acid. In other words, best results are obtained and strongest investments are produced with the new phosphate gel binders not only by observing the above mentioned water/powder ratio, but also by observing in addition a definite water/phosphoric acid ratio expressing the amount of water consumed by a definite amount of phosphate gel structures. This water/phosphoric acid ratio is best expressed in milliliters water consumed by one (1) gram phosphoric acid in the shape of phosphate gel. As previously pointed out, one gram phosphoric acid when transformed into gel structures is able to sorb up to at least 15 milliliters water while forming the gel. The strongest investments are produced, however, by utilizing a water/phosphoric acid ratio varying from about 6 to 12, that is, by using about 6 to 12 milliliters water per gram phosphoric acid. When more than 12 ml. water per gram phosphoric acid are used, the investments tend to set slowly. The gel aggregates thus formed are less densely packed than the gel aggregates produced with lower water/phosphoric acid ratios, and, after losing their water through dehydration binder skeletons are obtained having extremely thin walls and a very open structure. These thin-walled gel-skeletons collapse easily during dehydration procedures so as to shrink and crack.

In order to produce, therefore, good strong investments which will not shrink and crack, it is desirable to observe certain safeguards. Thus, for an investment containing a definite amount of phosphate binder, an increase in the water/phosphoric acid ratio beyond approximately 12 decreases the strength of the investment and produces a tendency to shrink. However, investments of this type tend to be porous. If, on the other hand, amounts of water are used which are strictly adjusted to a given phosphoric acid content of the investment, i. e. utilizing water/phosphoric acid ratios of about 6 to 12, gel structures are obtained which have a somewhat more closed pore structure. These gel structures after dehydration have relatively thick walls and strong investments are produced therefrom with a minimum of phosphate gel binder. Investments of this type appear to be most suitable for precision casting, since they are not only well vented, i. e. possess a satisfactory permeability, but also because they have very little tendency to shrink. If, on the other hand, a water/phosphoric acid ratio below 6 is employed, the gel structure tends to be very quick setting, and the investments tend to be very strong. This third type of gel structure can best be produced by forming the gel from highly concentrated binder solutions. The pore structures thus produced are more closed, and the strength of these investments increases proportionately as the pore size decreases. The foregoing applies to all standard investment mixtures including standard refractory materials with apparent densities from about 1.35 to 1.70. The same phenomena occur in utilizing heavier refractory materials or fillers such as zirconia having an apparent density of 2.2. To some extent they also apply to refractory materials lighter than the standard refractory materials, these materials being exemplified by kieselguhr, celite, silica gel powders, etc. These light weight materials, however, require substantially more water per unit of weight for making a paste and, therefore, a much higher water/powder ratio has to be utilized than with standard refractory materials. A celite investment, for example, requires a water/powder ratio of about 3 in order to produce a relatively smooth flowing paste and, therefore, substantially greater amounts of binder calculated on dry powder basis must be utilized in making investments from these materials. Even in the case of these light materials, however, the same general rules previously set forth relative to the water/phosphoric acid ratio should be utilized, even though the total amount of phosphoric acid will be greater, since a greater proportion of binder solution must be employed.

To produce the phosphate gel binder any solution of a primary metal phosphate, or, of a plurality of primary metal phosphates may be used which produces an insoluble secondary or tertiary metal-phosphate precipitate when reacted upon with metal oxides or hydroxides also belonging to the group of metals capable of forming insoluble secondary or tertiary phosphates. Primary metal phosphates of this type are those of the metals of groups 2 and 3 of the periodic system, and also the primary phosphates of copper, manganese, iron, cobalt, nickel and others. The preferred primary phosphates for producing the binder solution to be reacted upon by the oxides or hydroxides (precipitators) are the primary phosphates of magnesium, calcium, zinc, manganese, aluminum and iron (primary ferrous phosphate). The primary phosphates of these metals produce gel structures with the greatest power of sorbing water, and of these primary mangnesium phosphate is conclusively superior. Any primary alkali metal phosphate can be used in mixture with any of the above mentioned primary phosphates capable of forming insoluble secondary or tertiary phosphates in the shape of gel structures. Preferably, primary potassium and sodium phosphates are utilized in accordance with the present invention. The primary sodium phosphate is economically the most feasible salt to utilize for the primary alkali metal phosphates. However, it may be incorporated into the binder solutions in the form of secondary sodium phosphates, i. e. disodium phosphate and equivalent amounts of phosphoric acids added to produce the primary sodium phosphate.

As a precipitator, that is for producing the gel precipitate an oxide or hydroxide, or any equivalent salt may be used which will produce an insoluble phosphate with the primary phosphate solutions. The most effective precipitators and the preferred ones for use in the present process are the oxides and hydroxides of magnesium, calcium, zinc, and mixtures thereof. These particular phosphates produce gel structures which have a maximum water absorption power. However, magnesium oxide and hydroxide are highly preferred as the precipitator in accordance with the present invention. The gels formed utilizing magnesium oxide and hydroxide have been found far superior to any other. In place of calcium oxide, for example, calcium sulfate may be used in its hydrated forms, as well as in its dehydrated forms, and particularly when in admixture with about 25% magnesium oxide a high precipitation effect somewhat similar to pure magnesium oxide is produced. From this later admixture, a similar type of gel structure as that hereinbefore pointed out is produced. However, the presence of calcium sulfate tends to promote decomposition of the gel structure when used as an investment with high melting metals.

The precipitators are best used in theoretical amounts equivalent to the total amount of phosphoric acid present in the solutions producing the binder. This amount is calculated on the assumption that the total amount of phosphoric acid is transformed into tertiary phosphate. Since the solutions reacting with the precipitators already contain certain amounts of the precipitator metal in the form of a primary phosphate, the reaction under these circumstances proceeds with an excess of precipitator. However, tests revealed the interesting fact that no detrimental effect is produced by using an amount of the precipitator exceeding the theoretical amount; and as long as the excess of the precipitator remains restricted to amounts producing pH values not higher than about $pH_8$ at the end of the precipitating procedure. As already mentioned above, the phosphate gel structures developing highest sorbing powers are those produced from mixtures showing a final pH value from about $pH_7$ to $pH_8$. In doubtful cases the correct amount of precipitator is best determined by test. Samples of the primary phosphate solutions are treated with various amounts of precipitator in absence of the fillers.

Due to the extraordinary power of the new phosphate gel structures to sorb water, it is but natural that the rate at which they sorb water is also extremely high. Therefore, when the phosphate gel structures are incorporated into the investment materials (fillers), the problem of setting never arises. The setting proceeds with great rapidity. It is normally completed in about seven to twenty minutes. The investments in which the wax patterns are embedded can immediately be transferred to ovens to drive out wax and water after this very short setting period. Where an especially low water-powder ratio is used in presence of a relatively high phosphoric acid content, setting takes place in about five to seven minutes after appearance of the phosphate gel structures within the investment mixtures (filler plus binder).

However, such an extraordinary short setting period is not particularly desirable in the manufacture of investments for the precision casting procedure. The pastes tend to flow into the flasks in a rather stiff state. Therefore, they do not spread evenly and smoothly over the wax patterns. This sluggishness of the pastes may become especially harmful towards the end of the investing procedure. This tendency to set too quickly may be overcome by an increase of the water/powder ratio in order to make a more fluid paste which will remain fluid for a long period. There is a practical limit however to the increase of the water/powder ratio, since by so increasing the ratio beyond that stated hereinbefore, a very substantial decrease in strength of the dehydrated investments is produced. Further, the investment tends to become loose within the casting flasks and to develop cracks.

It was found that the difficulties arising from the very quick setting procedure are best overcome by using agents retarding the sorption rate of water by the newly formed phosphate gel structures. It has been found that any soluble neutral salt from the group of the strong mineral acids has the ability to change the sorption rate of water by the new gel structures. Not all of the neutral salts may be used, however, since the addition of these salts would prevent the investment from remaining inert at high temperatures, and therefore the preferred salts are the alkali metal halogen salts. Of the alkali metal halogen salts, the most useful retarders are the sodium and potassium chlorides. While of course the alkali metal nitrates and nitrites, for example, as well as the alkali metal sulfates act as retarding agents, these salts develop too much chemical activity at elevated temperatures and, therefore, where the gel structure is being used as an investment, these salts are not suitable.

Referring to the use of sodium and potassium chloride, it has been found that these salts start to produce a substantial retarding effect when used in amounts above about 1% calculated on the weight of the dehydrated investment, the best effects being produced when from 2 to 12% of the chlorides are used. Preferably, the best results from the retarding standpoint are achieved when amounts of the salt about equal to the amount of phosphoric acid are utilized. The alkali metal bromides and iodides act very similarly to the chlorides, and may be used either alone or in admixture. However, the alkali metal fluorides when dissolved in water have a tendency to behave like strong alkalies, and while the alkali fluorides may be used as retarders, a retarding action is produced which is many times greater than the retarding action of the other alkali metal halogen salts. Because of this great retarding action, the use of large amounts of alkali metal fluorides tend to prevent proper absorption of water by the gels. However, the alkali fluorides can be used in amounts from about 0.2 to 2% calculated on the weight of the dehydrated investment, or in amounts of about one gram of alkali metal fluoride per 100 milliliters of binder solution. The use of alkali metal fluorides has an advantage when the investment mixtures are to be used and poured over a substantial length of time. Preferably, the retarders aforementioned are best used when added to the filler materials, together with solutions producing the phosphate gel structures and simultaneously reacted with the precipitators incorporated in the filler materials. However, the retarding agents may be added in dry form to the filler materials which also contain the precipitators.

The use of even larger amounts of alkali halogen metal salts has been found to be especially desirable where it is desired to produce especially smooth surfaces with heavy sections and relatively large pieces in the pattern. Previous to the present invention, a double coating procedure was utilized, wherein the patterns were first coated with a slurry of silica flour and water glass. This apparently produced a water glass film on the surface of the wax pattern, and this water glass film lined the inside of the mold cavity. This water glass lining was also porous, and when the liquid metal was poured, a film of fused investment was formed so that the metals solidified in a smooth surface along this fused investment material. It has been found, however, that the same phenomena occurred in the present invention by increasing the amount of alkali metal halogen salt and particularly sodium chloride. Instead of using sodium chloride in an amount equal to the amount of phosphoric acid, i. e. mol for mol, it has been found that when a greater molecular proportion of sodium chloride is used, i. e. from 2 to 4 mols for each mol of phosphoric acid, the investments were particularly suitable for producing smooth surfaces with heavy sections and large patterns. As previously pointed out, the use of such a large quantity of alkali metal halogen salt tends to retard the setting time of the gel structure. This retarder effect, however, can be counteracted by using an accelerator such as a borax solution or a disodium phosphate solution as will be hereinafter set forth.

By using these alkali halogenide retarders in substantial amounts as outlined above, another great advantage is gained with regard to the new phosphate gel binders. The pure phosphate gels as produced by the procedures outlined above are, after dehydration, extremely fluffy; they have in the dehydrated state a very low apparent density; naturally, due to this the investments produced with these pure phosphate gel binders are all very permeable. However, these investments have in the completely dehydrated state a limited strength, and, when heated above about 900 to 1000 degrees Fahrenheit (482 to 538° C.) they expand rather irregularly. By adding the alkali metal halogenide retarders, the apparent density of the phosphate gel structures is practically doubled, subsequently, their mechanical strength is substantially increased; and what is more important, in this manner very uniformly expanding investments are produced. The aforementioned retarder agents appear to produce very special effects by entering the gel structure in the same manner as water. However, they do not become vaporized as does the water, and being homogeneously distributed throughout the gel structure they tend to reinforce the walls thereof and to give them mechanical strength and increased heat resistance. By fusing on the surfaces of the material, as hereinbefore pointed out, they also form a film which produces a smooth casting. However, this film is only effective when a substantial amount, i. e. the proportion of halogen salt or preferably sodium chloride, is utilized, as previously set forth.

Preferably, the solutions suitable for producing the new phosphate gel structures in accordance with the present invention are prepared in the following manner: A concentrated solution of primary magnesium, calcium, manganese, iron, nickel, cobalt, aluminum, zinc, etc. phosphate is prepared, or a mixture of these primary phosphates, either by dissolving the commercial monophosphates of these metals with a substantial excess of phosphoric acid, or by directly dissolving the oxides or hydroxides of these metals with an excess of phosphoric acid. Any commercial form of phosphoric acid, 50%, 75%, or 85% may be used. Best results are obtained by using 2½ to 3½ mol $H_3PO_4$ per one mol metal oxide. The resulting solution is diluted with water to make either 1000 or 2000 milliliter solution (solution A). Thereafter, a fairly concentrated solution of a secondary or tertiary alkali metal phosphate is made, containing about 1 to 2 mol phosphate. Experience showed that di-sodium-phosphate ($Na_2HPO_4.12H_2O$) lends itself best for making the required binder solutions; about 1½ mol (537.3 grams) are dissolved in water to make 2000 milliliter solution (solution B).

By combining solutions A and B in a manner that the pH value of solution A is changed from $pH_1$ to $pH_3$ or $pH_4$, a solution may be produced which contains at least one primary metal phosphate able to form insoluble secondary and tertiary phosphates and, also, the primary alkali metal phosphate as is required to produce the gel structures obtained by reaction with such precipitators as those hereinbefore specified.

As may be understood, the binder solutions may be modified within the broad concept of the present invention, as for example by using the commercially well-known mono-calcium phosphates in the form of "cured super-phosphates." Commercially available mixtures of mono-phosphates of this type may be utilized in combination with the alkali metal phosphates in the proportions specified. These commercially available phosphates are dissolved in water as required to produce a gel with the filler and precipitator. The gel binder can be used for making investments in combination with almost any of the well known inorganic refractory fillers. For example, silica flour and sand in their principal natural modifications, such as quarts, trydymite and cristobalite can be used. Other inorganic fillers of a refractory nature, such as alumina, zirconia, chrome ore, kieselgur and celite can be used. Such types of fillers as feldspar, kryolite, andalusite, kaolin, mullite, silica gel, and graphite can be used, but being of a colloidal and plastic nature produce particular effects in combination with the new binders. For example, they tend to have a retarding action on the setting procedure, and in most instances they decrease the permeability of the investment. This is probably due to the colloidal or partly colloidal and plastic state of these materials. While these materials tend to decrease the permeability of the investment, they also tend to improve the surface of the casting. They may, therefore, be used in amounts from about 1 to 8% calculated on dry powder for this purpose. Preferably, however, they are not used in any larger amounts, since they impair the permeability of the investment to too large a degree.

The investment mixtures also containing the proper amounts of precipitators when mixed with the binder solutions do not instantly react with one another. The reaction has an inception period of about 30 to 45 seconds in the absence of retarders; whereas in the presence of retarder agents it takes about 75 to 90 seconds until the reaction takes place. After these inception periods, the rapid reaction between binder and precipitator is indicated by an abrupt thickening of the mixture. Where very concentrated binder solutions are used the mixture may even solidify during this sudden reaction. This premature solidification will not take place, however, when chemicals and water are used in proper proportions, as hereinbefore set forth. Further, it is undesirable to simply mix together the entire quantity of investment powder and binder solution and stir the same, since it is difficult to form the proper type of gel, and consequently the proper investment in this manner. This is particularly true where a high speed stirrer is used. The gel structures under these circumstances tend to be partly destroyed apparently through "overspatulation." An investment of this type tends to set rather slowly, and after dehydration is relatively weak. The preferred procedure in forming the investment is by adding a mixture of investment powder and precipitator to the chemicals required for producing the binder, these chemicals being dissolved in only 50 to 75% of the total liquid required for producing the proper consistency slurry. The reaction between the precipitators and the remainder of the binder components takes place in the presence of this limited amount of liquid, and a better gel structure seems to be produced in this manner. After the initiation of the reaction, the remaining liquid is added and the newly formed gel structures are transformed into a thick creamy paste. By treating the investment powders in this manner, a moist mixture or loose dough is first formed during the inception period. Thereafter the reaction takes place and the mass stiffens due to the formation of the gel. The formation of the gel structure is also accompanied by sudden change of pH value from $pH_3$ to $pH_4$ to $pH_6$ or 7. Thereafter, the remainder of the liquid is slowly poured in during slow stirring or kneading action, and the gel structures are slowly transformed into the paste. This last condition is obtained in about 1 to 1½ minutes after the reaction starts. The pouring of the slurry or paste into molds at this point produces the best investments. The creamy paste readily envelops the wax pattern, especially when the flasks are vibrated, and the entrained air can be readily removed with the aid of a vacuum along with continued vibration. After pouring, the mixture quickly develops a glossy appearance, which is a symptom of rapid setting. The temperature of the slurry rises about 6 to 12° C. (11 to 22° F.) during the one to two minute period following the inception period. As pointed out, rapid agitation or mixture is undesirable, and a type of mixer should be used producing a kneading action, rather than a stirring or cutting action.

The above method of producing the investment slurry has the additional advantage that it enables one to incorporate into the surry at will substances which act to improve the surfaces of the castings when the product is used as an investment in precision casting. It was found that small amounts of alkali metal salts having a mild alkali reaction, such as borax, alkali metal fluorides, and even alkali metal di- and mono-phosphates, when added to the slurry shortly after the gel structures have formed and together with the amount of water necessary to produce the final slurry act as surface improvers and also as accelerators or as mild retarders. For instance, borax acts as an accelerating agent up to about 0.5% based on the amount of filler used and best accelerating effects are obtained with about 0.3%. By adding more than 0.5% of borax and up to 1.0% thereof an increased retarder action is produced. Disodium phosphate may be added for similar purposes and in amounts equal to from 2 to 3%, based on filler. If the investment contains less than about 4% of alkali metal halide the disodium phosphate has little effect. With 4 to 7% of alkali metal halide present the phosphate acts as an accelerator.

Plasters made with the new phosphate gel binders start to dry instantly after setting, in the same manner as the gypsum-bonded products. The vapor tension of both types of gel binders seems to be practically alike since water evaporates from both types of investments at practically identical rates, especially above 75° C. Phosphate bonded investments lose the greater part of their water content at the temperature at which the wax is melted out during the wax melting-out procedure, and become completely dehydrated at about 120° C. (250° F.) within a few hours. The wax residue may be burnt out from the practically dehydrated investments at about 500 to 800° F. (260 to 430° C.), with the same ease as from the gypsum-bonded investments, especially when the wax-burn-out takes place in well ventilated electrical furnaces. The new investments are ready to be used for casting even if the last remnant of carbon is removed at temperatures as low as about 700 to 800° F. (about 370 to 430° C.). However, best castings having superior surfaces are produced after subjecting the completely calcined and burnt-out investments to an additional heating at still higher temperatures, upwards to about 1300 to 1400° F. (700 to 760° C.). It seems that by submitting the investments to a heating procedure at temperatures close to or at the fusion point of the alkali metal halides, such substances as sodium chloride or other substances previously mentioned as retarders, accelerators, or surface improvers are diffused into the filler particles. The filler particles are thus molded together and this action gives the investments additional strength and ruggedness while at the same time greatly improving the permeability of the finished investment. Best casting results are produced by casting into hot molds; especially into molds cooled only to about 800 to 1000° F. (450 to 540° C.).

In other words, a preferred casting procedure is to heat the dehydrated mold to a temperature adjacent or just above the melting point of the alkali metal halide used (melting point of sodium chloride 1480° F.) and thereafter cool the mold to a temperature between about 1100 and 800° F. and cast the molten metal in the hot mold at this temperature range.

The following specific examples serve to illustrate the present invention, but are not intended to limit the same:

EXAMPLE 1

*Procedure for making a binder solution*

Solution A—Into a mixture of 40 grams precipitated magnesium oxide (MgO) and about 500 milliliters cold water were slowly poured, while stirring, 246 milliliters phosphoric acid (85%), equal to 344 grams $H_3PO_4$. After cooling to room temperature cold water was added to this solution to make a total of 1000 milliliters. 100 milliliters of this solution contained 4.0 gram MgO and 34.4 gram phosphoric acid $pH_1$.

Solution B—550 grams di-sodium phosphate ($Na_2HPO_4.12H_2O$) were dissolved in about 1500 milliliters warm water. The above amount of salt was completely dissolved in water of about 80° F. (27° C.). Water was then added to make a total of 2000 milliliters.

100 milliliters of this solution contained 7.53 grams phosphoric acid, or, 10.9 grams $Na_2HPO_4.pH_8$.

*Binder solution*—Through titration with brom phenol blue it was found that 125 milliliters of solution A require 225 milliliters of solution B to produce $pH_3$. Therefore, by mixing solutions A and B in the above proportions, a solution was produced containing:

In 100 ml_____17.2 grams $H_3PO_4$, or,
In 58 ml_____10.0 grams $H_3PO_4$, or,
In 350 ml_____60 grams $H_3PO_4$ (59.9 grams)

and, 41% of the phosphoric acid were due to its content of $Mg(H_2PO_4)_2$; 59% were due to its $NaH_2PO_4$ content.

The above binder solution was ready for use and produced good results when combined with a precipitant with and without sodium chloride as a retarder agent.

EXAMPLE 2

1500 grams silica flour (sieve #325) were mixed with 42 grams precipitated magnesium oxide containing about 35 grams MgO. 350 ml. of the binder of Example 1 were added to the silica flour while stirring with a slow stirrer producing a kneading action. The binder contains a total of 60 grs. $H_3PO_4$, 24.6 grs. of this total as monomagnesium phosphate, and the rest (35.4 grs.) as monosodium phosphate.

By adding 350 ml. binder to 1500 grs. silica flour a mixture was produced having a water/powder ratio of W/P—0.23. This is not sufficient to produce a dough consistency; only a wet powder consistency was produced, with many small lumps. After one minute stirring 100 ml. water were added to this wet mixture; thus the water/powder ratio is changed to W/P—0.30, and a rather loose dough is formed. After about 35 seconds "reaction" took place; the loose dough changed suddenly into a stiff dough. After completion of the second minute the pH value changed to $pH_7$. Now 150 ml. of solution B were added as a surface improving agent. The W/P ratio was changed to 0.40. A relatively thin soup was for a few seconds formed; this soup changed quickly into a creamy paste, practically within the next 20 to 30 seconds. This paste was now vibrated over the wax patterns. $pH_9$ after casting investment.

Mixing and pouring took about 9 minutes. The investments were set seven minutes after pouring, or 16 minutes after starting the procedure of mixing. The setting is effected with a water/phosphoric acid ratio of 10.0 in presence of a W/P ratio of 0.40.

The 458 grams of this investment when heated for 48 hours at 170° F. (77° C.) lose a total of 91 grs. through water vaporization; on further heating at this temperature the weight of the investment stays constant. Therefore, during the wax melting procedure the weight loss of the above type of investments was about 20%.

On further heating the wax remnants burned out easily, especially at about 800 to 1000° F. (427–538° C.). Thus a perfectly white, extremely well vented investment was produced suitable for casting iron alloys and similar high melting alloys. This type of investment, being still relatively soft, produced good metal casts with the vacuum casting procedure.

EXAMPLE 3

42 grams precipitated commercial magnesium oxide containing about 35 grams MgO were thoroughly mixed with 1500 grams silica flour (sieve mesh #325). 60 grams common salt (NaCl) dissolved in 350 ml. of the binder solution of Example 1.

The above solution was added to the silica flour/magnesia mixture while stirring. Due to the still low W/P ratio of 0.23, a wet powder with many tiny lumps was formed. After one minute stirring 100 ml. water were added to the mixture. This changed the W/P ratio to 0.30. A thick paste now formed. After two minutes stirring "reaction" took place with subsequent formation of a thick dough. The pH value now changed to $pH_7$. 150 ml. of solution B were added (containing a total of 11 grams disodium phosphate). Due to this change in the W/P ratio the dough quickly breaks down into a smooth creamy paste. After another 30 seconds stirring the paste was vibrated over wax patterns. pH after pouring: $pH_7$.

Mixing and pouring took about 8 minutes. The investment was set 25 minutes after pouring and 33 minutes after starting the procedure of mixing the powder with the binder solution. W/P—0.40; $W/H_3PO_4$—10.0.

191 grams of this newly prepared and set investment lost a total of 25 grams, or 13.7% of its total weight when exposed to open air drying for 3 days. 386 grams of the same investment when dried for 48 hours at the wax melting temperature (170° F.) lost 79 grams, or 20% of its original weight. Therefore, the new investments release the water sorbed during the setting procedure with the same ease during the wax melting procedure as gypsum-bonded investments.

On further heating to about 1000° F. the wax remnants are quickly burnt out, especially in presence of a strictly oxidizing atmosphere. After the burn-out procedure the temperature was gradually increased to about 1300 to 1400° F. Very strong and well vented investments were produced standing any type of metal casting procedure, centrifugal or vacuum casting. Smooth surfaces were obtained with any type metal, low or high-melting. This investment also separated readily from metal casts; at least as easily as gypsum bonded investments.

The common salt of the present example was used as a retarder agent, about 4% being used, calculated on dehydrated investment. In other respects the example is the same as Example 2. Due to the presence of the common salt, however, setting took place only after 33 minutes, after the start of the mixing procedure. In other words, due to the presence of common salt, the setting time was practically doubled. The common salt also gave the investment greater strength and ruggedness, and a more regular expansion. No change in the permeability characteristics due to the presence of the common salt was observed. The final pH value did not reach as high a point and did not go beyond $pH_7$.

EXAMPLE 4

Four types of investments were made with W/P ratios varying from 0.43 to 0.53 but with a constant water/phosphoric acid ratio of about 9.2. The same type of binder was used and the same amount of silica flour (1500 grams #325 sieve). Commercial magnesium oxide and water were used in amounts as specified in the table.

Magnesium oxide and silica flour were thoroughly mixed, the binder solutions were in each case added while stirring, as in previous examples outlined. Due to the slightly higher W/P ratios of the silica-binder mixtures than in previous examples (0.27—0.29—0.32—0.34) a stiff dough is in each case produced having the tendency to break apart.

After about 35 seconds "reaction" takes place. Subsequently the dough gets stiffer and stiffer. During the following and second minute the specified amount of water was slowly added while stirring. Shortly after the reaction the pH value is in each case pH-6, and after the second minute it is pH8 and pH9; this clearly shows how rapid the gel structures are formed. All four types of investment mixtures set practically in the same manner, within about 18 to 25 minutes.

|  | 1 | 2 | 3 | 4 |
|---|---|---|---|---|
| Water/powder ratio: |  |  |  |  |
| W/P | 0.43 | 0.45 | 0.50 | 0.53 |
| W/H$_3$PO$_4$ ratio | 9.2 | 9.2 | 9.2 | 9.2 |
| Binder ml | 408 | 431 | 478 | 507 |
| H$_3$PO$_4$ content grs | 70 | 74 | 82 | 87 |
| MgO commercial grs | 45 | 47 | 52 | 56 |
| Water ml | 237 | 244 | 272 | 293 |
| Total liquid ml | 645 | 675 | 750 | 800 |
| pH after 1st minute | 6 | 6 | 6 | 6 |
| pH after 2nd minute | 9 | 8 | 9 | 9 |
| pH after casting | 8 | 8 | 9 | 9 |
| Setting time minutes | 25 | 19 | 18 | 18 |

The dehydrated investments were of the same type as those of Example 2, but stronger than those of Ex. 2. This is due to the higher phosphoric acid content; the H$_3$PO$_4$ content in the above cases varying from about 4.6 to 5.8%, calculated on dehydrated investments. The above investments were very well vented and produce smooth surfaces with metal casts, and very sharp contours.

EXAMPLE 5

Four investment mixtures were made, each with 1500 grs. silica flour (#325 sieve), and with the binder solution of Example 1. Variable amounts of common salt (NaCl) are used as retarder agent and also for improving the dehydrated gel structures with regard to strength, and expansion properties. The characteristics of these investments are as follows:

|  | 1 | 2 | 3 | 4 |
|---|---|---|---|---|
| Silica Flour grs | 1,500 | 1,500 | 1,500 | 1,500 |
| MgO commercial grs | 42 | 42 | 42 | 68 |
| Binder, Ex. 1 ml | 350 | 350 | 350 | 524 |
| H$_3$PO$_4$ content grs | 60 | 60 | 60 | 90 |
| NaCl, common salt grs | 15 | 45 | 60 | 90 |
| Water ml | 225 | 250 | 250 | 226 |
| Total liquid ml | 575 | 600 | 600 | 750 |
| W/P ratio | 0.38 | 0.40 | 0.40 | 0.50 |
| W/H$_3$PO$_4$ ratio | 9.6 | 10.0 | 10.0 | 8.3 |
| pH after 2nd min | 8 | 8 | 7 | 7 |
| pH after casting slurry | 8 | 7 | 7 | 7 |
| Setting Time min | 19 | 23 | 24 | 45 |

With 15 grs. (about 1%) NaCl the investment mixtures react similarly to those made without common salt. Common salt does not yet substantially influence the setting procedure. However, by increasing the common salt content to 3, 4, 6 and even more percent the setting procedure is substantially delayed. The investment mixtures thus obtained are, after dehydration very strong, sit very firmly in the iron flasks, were well vented and produce with the metal casts very smooth surfaces. Bromides and iodides of sodium which melt at practically as high a temperature as sodium chloride were found to give similar results.

EXAMPLE 6

Six batches of investment mixtures were made as follows:

| | |
|---|---|
| Silica flour #325 sieve grs | 1500 |
| MgO, commercial grs | 63 |
| Binder Example 1 ml | 540 |
| H$_3$PO$_4$ content grs | 90 |
| NaCl grs | 60 |
| Water ml | 235 |
| Total liquid ml | 775 |
| W/P ratio | 0.52 |
| W/H$_3$PO$_4$ ratio | 8.7 |

By adding 540 ml. binder to the above mixture of silica flour and magnesium oxide a stiff, smooth dough was produced due to the relatively high W/P ratio (0.36). This dough became still stiffer after about 70 second stirring. This was due to the sudden "reaction." 200 ml. water were now added. This produced instantly a very smooth dough. After a total of two minutes stirring the dough's pH value was pH7. Adding another 35 ml. water produced a smooth creamy paste. After vibrating this paste over the wax patterns the paste's pH was still pH7.

Six such investment batches were made alike. The setting time for each batch was as follows:

| Batch No: | Minutes |
|---|---|
| 1 | 39 |
| 2 | 31 |
| 3 | 39 |
| 4 | 26 |
| 5 | 37 |
| 6 | 39 |

After melting out the waxes and burning out the wax remnants at previously specified temperatures, and after submitting the thus completely dehydrated investments to a substantial soaking anneal at gradually rising temperatures up to about 1400° F. (760° C.), well vented, hard investments were produced, sitting tightly in their flasks. They were suitable for any precision casting procedure and for any alloy or metal melting at temperatures above 1800° F. (982° C.), and also for any low-melting alloy or metal.

EXAMPLE 7

1500 grs. silica flour (sieve #325) were mixed with 50 grs. commercial MgO and with 350 ml. binder solution of Ex. 1. Due to the still low W/P ratio (0.23) a moist powder with many tiny lumps is formed. After the mixture was stirred for one minute, 200 ml. of a solution of 325 ml. water and 60 grs. common salt were fed thereinto. Shortly after the first 100 ml. of this solution were fed in, the "reaction" takes place, and shortly afterwards a very soft dough was formed having a pH7 value after a total of two minutes. Adding the remaining 125 ml. sodium chloride solution produced a smooth creamy paste which easily flows over the wax pattern and spreads very readily when vibrated. The characteristics of the above investment mixture were as follows:

| | |
|---|---|
| Silica flour, sieve #325 grs | 1500 |
| MgO commercial grs | 50 |
| Binder sol. Ex. 1 ml | 350 |
| H$_3$PO$_4$ content grs | 60 |
| NaCl solution ml | 325 |
| NaCl content grs | 60 |
| Total solutions ml | 675 |
| W/P ratio | 0.45 |
| W/H$_3$PO$_4$ ratio | 10.1 |
| Setting Time minutes | 35 |
| Final pH value | pH7 |

The foregoing example shows that there is no particular difference as to how the retarder agent is incorporated into the investment as long as the retarder is present during the period that the already formed gel structures start to form the final gel.

The above investment mixtures produced after dehydration and after submitting them to the above outlined soaking anneal at higher temperatures the same rugged, hard, well vented investments as all the other investments containing the specified retarder agents.

EXAMPLE 8

1400 grs. silica flour (sieve #325) were mixed with 45 grs. commercial MgO.

A binder solution was made as follows: 350 ml. of the binder solution of Example 1 are diluted with 350 ml. of solution B of the same example, containing 38 grs. disodium phosphate ($Na_2HPO_4$)

equivalent to 26 grs. phosphoric acid. The pH value of this solution B is pH8. Thus a binder solution of a total volume of 700 ml. is obtained having a pH value of pH4 due to the additional disodium phosphate content. Into this binder solution were incorporated 60 grs. NaCl (sodium chloride). This binder solution has now a total phosphoric acid content of about 86 grs. Of this total are present As magnesium monophosphate____ 25 grs. $H_3PO_4$
As sodium monophosphate_____ 35 grs.
As disodium phosphate_____ 26 grs.

With this type of a binder the investment slurry was produced as follows:

350 ml. were stirred into the silica flour and magnesia mixture. A moist mixture is thus produced. Stirring is continued. During the second minute were incorporated another 300 ml. of the same bnder. A paste was thus produced having a pH value of pH6. Finally, the remaining 50 ml. of the binder were added producing during the next 30 seconds a very creamy slurry, easily flowing over the wax pattern.

This investment slurry has been formed with a W/P ratio of 0.50, and a $W/H_3PO_4$ ratio of 6.1. Setting time, 45 minutes.

After dehydration and after submitting the investment to the specified soaking anneal a perfect, tight sitting hard, well vented investment is produced suitable for any precision casting procedure. The metal casts obtained with this type of investment show very smooth surfaces, sharp contours and the investment itself is most easily separated from the metal surfaces.

This example illustrates the fact that by adding to binder solutions which primarily consist of mixtures of monophosphates, a slightly alkaline phosphate such as disodium phosphate, the pH can be increased to 4 without deleteriously affecting the final investment so that the disodium phosphate acts as a surface improving agent. This effect can not be produced with alkali metal phosphates of the tertiary type, such as tri-sodium phosphate. Tri-sodium phosphate does not interfere with the setting of the investment, but the dehydrated investments which were made from solutions containing tertiary alkali metal phosphates produce chemically active fusion phenomena with the hot metal surfaces of the casts. The finished castings under these circumstances have rough surfaces. The presence of free phosphoric acid lowering the pH to below 3, i. e. an amount of phosphoric acid about 1% is also detrimental, since it interferes with the formation of the gel structures. The disodium phosphate in this particular example seems to form a phosphate gel structure, since it is present before the gel is formed and is not added afterwards as in previous examples.

EXAMPLE 9

Two investment mixtures were made with silica flour, magnesium oxide and the binder of Example 1. The mixtures had the following characteristics:

| | | |
|---|---|---|
| Silica flour #325 sieve_____grs__ | 1,400 | 1,500 |
| Magnesium oxide _____grs__ | 45 | 68 |
| Binder Ex. 1_____ml__ | 350 | 525 |
| Prosphoric acid content_____grs__ | 60 | 90 |
| NaCl _____grs__ | 60 | 60 |
| Water _____ml__ | 100 | 350 |
| Solution B, Ex. 1 $Na_2HPO_4$__ml__ | 350 | ____ |
| Total liquid _____ml__ | 800 | 875 |
| W/P ratio _____ | 0.57 | 0.58 |
| $W/H_3PO_4$ ratio _____ | 13.3 | 9.7 |
| pH after second min_____ | 6 | 6 |
| pH after casting slurry _____ | 7 | 8 |
| Setting Time _____min__ | 79 | 36 |

Silica flour and magnesia were in both cases stirred for 1 minute with the binder. During the second minute water, water plus solution B, respectively, were added to produce the slurry. In both cases a beautifully creamy slurry was obtained vibrating very well and quickly over the wax patterns. This was due to the relatively high W/P ratio (0.58).

In the above instances there is a very pronounced difference in the setting time. In contrast to Example 8, it is evidenced that in this particular case the disodium phosphate does not act as a gel producing agent. Only the 60 grams of phosphoric acid act as a gel producer in batch #1. The remaining 26 grams of a phosphoric acid added as disodium phosphate are not active, since they are incorporated after the "reaction." Batch #2 on the other hand shows by way of comparison the activity of a gel containing 90 grams of phosphoric acid in a slurry of a W/P ratio of 0.58. The dehydrated and calcined investments of batch #2 were stronger than those of batch #1.

EXAMPLE 10

Five batches of investment mixtures were made, each with 1500 grams silica flour, sieve #325, with an increasing amount of binder. Separate from the binder a solution was made of borax ($Na_2B_4O_7.10$ aq.) however in such manner that in each case 15 grams borax will be incorporated into each investment slurry (7.9 grams $Na_2B_4O_7$). Other conditions were equal in each case, as shown by the following table:

| | 1 | 2 | 3 | 4 | 5 |
|---|---|---|---|---|---|
| Silica flour_____grs__ | 1,500 | 1,500 | 1,500 | 1,500 | 1,500 |
| MgO_____grs__ | 45 | 53 | 60 | 68 | 75 |
| Binder Ex. 1_____ml__ | 350 | 408 | 466 | 524 | 582 |
| $H_3PO_4$ content_____grs__ | 60 | 70 | 80 | 90 | 100 |
| NaCl_____grs__ | 60 | 60 | 60 | 60 | 60 |
| Borax, 15 grs. dissolved in_ml__ | 350 | 292 | 234 | 176 | 118 |
| Total liquid_____ml__ | 700 | 700 | 700 | 700 | 700 |
| W/P ratio_____ | 0.47 | 0.47 | 0.47 | 0.47 | 0.47 |
| $W/H_3PO_4$ ratio_____ | 11.7 | 10.0 | 8.8 | 7.8 | 7.0 |
| pH after 2 min_____ | 4 | 6 | 6 | 6 | 7 |
| after casting slurry_____ | 6 | 7 | 7 | 8 | 8 |
| Setting time_____min__ | 180 | 125 | 64 | 62 | 68 |

With the batches using a water/phosphoric acid ratio from about 12 to 10 the borax solution very substantially interferes and produces a very strong retarder effect, especially when the borax solution is introduced into the system before "reaction" has taken place. However, with W/H$_3$PO$_4$ ratios varying from about 9 to 7 and less the borax solutions produce only a slight retarder action in addition to the common salt retarder action, and as will be shown hereinafter, when the borax is used in lesser amounts, it even acts as an accelerator.

The borax-treated investment mixtures developed a beautifully creamy slurry. The burnt-out investments were strong, hard, expand regularly, and, when submitted to a prolonged soaking anneal at temperatures of about 1400° F. investments were produced into which any type of metal can be cast with any precision casting procedure. Very superior surfaces are produced with the above type of investments.

EXAMPLE 11

Four batches of investment mixtures were made with various surface improving chemicals. The character of the mixtures is as follows:

| | 1 | 2 | 3 | 4 |
|---|---|---|---|---|
| Silica flour_____grs__ | 1,500 | 1,500 | 1,500 | 1,500. |
| MgO_____grs__ | 50 | 50 | 50 | 53. |
| Binder Ex. 1_____ml__ | 350 | 350 | 350 | 408. |
| H$_3$PO$_4$ content_____grs__ | 60 | 60 | 60 | 70. |
| NaCl_____grs__ | 60 | 60 | 60 | 60. |
| Water_____ml__ | 325 | 325 | 325 | 292. |
| dissolved | 35 grs. Na$_2$HPO$_4$ | 7.5 grs. Borax | 7.5 grs. KF | 7.5 grs. KF, 7.5 grs. Borax. |
| Total liquid_____ml__ | 675 | 675 | 675 | 700. |
| W/P ratio | 0.45 | 0.45 | 0.45 | 0.47. |
| W/H$_3$PO$_4$ ratio | 11.2 | 11.2 | 11.2 | 10.0. |
| pH after 2 min | 7 | 5 | 6 | 6. |
| after casting slurry | 7 | 7 | 7 | 6. |
| Setting Time_____min__ | 27 | 27 | 70 | 46. |

As previously set forth, disodium phosphate when incorporated after the "reaction" did not interfere with the water absorption ability of the phosphate gel structures. It is evident from the foregoing example that the same phenomena occurs to borax when used in small amounts (batch 2) and in mixtures producing the phosphate gel structure with a water/phosphoric acid ratio of about 11 or less. Potassium fluoride and other alkali metal fluorides produce a substantial retarder effect when used in this manner. When potassium fluoride is used in mixture with borax, the detrimental effect of potassium fluoride upon the setting procedure is partly compensated. Thus borax tends to act as an accelerator in combination with halogen salts. It is to be noted that the setting time of batch 4 which contains both potassium fluoride and borax is 46 minutes as compared to a setting time of 70 minutes in batch 3. All four types of investments when slowly heated up to about 400° F. and kept at this temperature for some time after dehydration produce strong hard investments into which any type of metal can be satisfactorily cast.

EXAMPLE 12

Two batches of investment mixtures were made with silica flour and celite, respectively, with silica flour, sand and celite.

Celite and sand as used in the following batches considerably changed the apparent density of the silica flour which normally has an apparent density of 1.35. Celite with an apparent density of 0.34 adds bulkiness to any mixture. Sand (60 to 80 mesh and less) has an apparent density of about 1.70 and, therefore, it would increase the apparent density of any mixture. Sand and celite have been found to be useful modifying agents therefore for fillers so that investments can be made having definite permeabilities. The following two batches exemplify modified fillers of this character used with the new phosphate gel binder:

| | 1 | 2 |
|---|---|---|
| Silica flour_____grams__ | 1,000 | 1,400 |
| Celite_____do__ | 200 | 100 |
| Sand_____do__ | | 500 |
| Apparent density | 0.953 | 1.515 |
| Magnesia_____grams__ | 68 | 68 |
| Binder Ex. 1_____ml__ | 525 | 525 |
| H$_3$PO$_4$ content_____grams__ | 90 | 90 |
| NaCl_____do__ | 60 | 60 |
| Water_____ml__ | 400 | 350 |
| Total liquid_____ml__ | 925 | 875 |
| W/P ratio | 0.77 | 0.58 |
| W/H$_3$PO$_4$ ratio | 10.3 | 9.7 |
| pH after 2nd min | 7 | 6 |
| final pH | 7 | 8 |
| Setting Time_____min__ | 33 | 27 |

Mixing the above fillers with the binder solution produced a stiff dough during the first minute. Shortly after the first minute "reaction" took place. The dough then quickly stiffened. About 250 ml. water were then fed in during the second minute, the remainder during the third minute.

The investments dehydrated very readily. The calcined investments were relatively light, however, still strong, expanded regularly and produced the same smooth surfaces as the other investments.

From the above two batches it will be noted that the apparent density of the silica flour is substantially decreased by mixing it with celite as in batch #1, having an apparent density of 0.953, and it is increased by the use of sand, the apparent density of batch #2 being 1.515. The addition of sand to silica flour causes an increase in the apparent density of the mixture up to about 66% sand content. Greater amounts of sand above 66% however, merely cause the mixtures apparent density to drop relatively quickly to the value of pure sand. In other words, the apparent density of silica flour/sand mixtures increases until the silica flour content has decreased to about 33%. This maximum value of apparent density is produced with any type of sand/silica flour mixture but varies in accordance with the following chart, to some extent, with each type of sand:

| Type of sand | Apparent density of— | | |
|---|---|---|---|
| | sand | 66/33 sand/silica flour | silica flour |
| 20 to 50 mesh | 1.49 | 2.00 | 1.35 |
| 60 to 120 mesh | 1.70 | 1.96 | 1.35 |
| 60 to 150 mesh | 1.76 | 2.03 | 1.35 |

The most densely packed investment mixtures as shown above are produced with ⅔ sand to ⅓ silica flour mixtures. Filler mixtures of this type can be transformed into a well pouring investment slurry with a very low W/P ratio, i. e. not more than about 0.23 to 0.33. Such closely packed fillers, however, do not produce investments having a good permeability. In order to produce an investment with a good permeability, the silica flour/sand mixture should contain not more than about 50% of sand and from 20% to 50% of sand has been found to be a desirable mixture. Such a mixture has an apparent density which is sufficiently close to the maximum apparent density value so that is can be transformed into a well pouring investment slurry with a low W/P ratio. This produced a calcined refractory or investment of great strength while at the same time having a sufficiently open structure due to good permeability. The permeability of investments thus produced can be further improved by adding to the above specified silica flour/sand mixtures minor amounts of light refractory materials such as celite, kieselguhr, graphite, and silica gel in quantities up to about 5 to 7%.

EXAMPLE 13

Two batches of investment mixtures were made with fillers as follows:

| | |
|---|---|
| Silica flour, sieve 325 grams | 1333 |
| Sand, apparent density 1.757 do | 600 |
| Celite, apparent density .34 do | 67 |
| Total weight of mixture do | 2000 |
| Apparent density of mixture | 1.524 |
| Magnesia grams | 65 |

By using 67 grams celite the apparent density of the above 66/33 silica flour/sand mixture was changed from 1.73 to 1.524.

Two batches of the binder solution of Example 1 were modified as follows: 60 grams of common salt were dissolved in 350 ml. of the binder solution. The volume of the solution changed therefore from 350 to 375 ml. To one batch of 375 ml. were now added 250 ml. of solution B of Example 1. An excess of disodium phosphate was thus incorporated into the above binder solutions; in the first instance 27 grams disodium phosphate which was equal to 18 grams $H_3PO_4$, and the second batch equal to 25 grams disodium phosphate or 16 grams $H_3PO_4$. The total volume of the modified binder solution was 625 ml. for batch 1 and 600 ml. for batch 2. Each of these modified binder solutions was mixed with 2000 grams of the aforementioned filler mixture. The W/P ratio of the first batch was 0.31, and of the second batch 0.30. A stiff dough was produced in about 90 seconds. After 120 seconds, 175 ml. of solution B of Example 1 (the disodium phosphate solution) were fed into each batch. A W/P ratio was produced in batch 1 of 0.40 and in batch 2 of 0.39, and the stiff dough broke down into a smooth creamy slurry which was then poured over wax patterns. The pH value of the stiff dough in each of the two batches was $pH_6$ after the second minute and $pH_7$ after pouring. These batches illustrate due to the slow change of pH value, that the reaction proceeds at a slightly slower rate than with the standard binder solutions which contain practically no disodium phosphate. This is also indicated by the smaller temperature change of the slurry, the temperature changes produced during the time the slurry is made being as follows:

| | 1 | 2 |
|---|---|---|
| Initial temperature of modified binder centigrade | 27 | 28 |
| Final temperature of slurry do | 33 | 34 |
| Temperature increase do | 6 | 6 |
| Setting time minutes | 29 | 27 |

As compared to the above, the standard binder mixtures produce an increase in temperature of about 10 to 12° C. with any type of filler material. The investments of this example dehydrate very quickly at low temperatures of the wax melting ovens. They change quickly and normally into a refractory of great mechanical stability and very great permeability at higher temperatures and particularly at 800 to 1400° F. (430 to 760° C.). The metal castings made in these refractories have smooth surfaces and separate easily from the refractory.

EXAMPLE 14

Filler: Celite only
    Apparent density _____ 0.34

300 grams of celite were mixed with 60 grams of magnesia. This mixture was then treated with 750 ml. of a modified binder solution which was made from 350 ml. of the binder solution of Example 1, 60 grams of NaCl, 75 ml. water, and 300 ml. of solution B of Example 1 (disodium phosphate solution). Reaction was then effected with a W/P ratio of 2.3, a pasty dough being produced. Reaction took place after about 90 seconds of kneading. 150 ml. of water were then added to the dough, after the second minute, producing a sudden break down into a creamy slurry with a final W/P ratio of 3.0 pH. The slurry was easily poured over wax patterns; pH after pouring $pH_8$. The slurry set in about 40 minutes, and was then dehydrated substantially completely at the low temperatures of the wax melting ovens. When heated at temperatures from about 400 to 650° C. a refractory of relatively great mechanical stability and particularly of extremely high permeability was produced. A material of this type was found to be especially suitable for making castings from metals and alloys having a low specific gravity.

EXAMPLE 15

A. Binder was prepared as follows:
500 ml. of the binder solution of Example 1 were diluted with 300 ml. water to make 800 ml. total. This solution of a total of 800 ml. contained 86 grams phosphoric acid.

205 grams sodium chloride were dissolved in the above solution (1 mol phosphoric acid and 4 mol sodium chloride). The volume of the above solution was increased to about 875 ml. by dissolving the sodium chloride.

850 ml. of the binder solution thus formed contains 83 grams phosphoric acid and 199 grams sodium chloride.

B. The investing slurry was produced as follows:
(a) *Filler*

| | Grams |
|---|---|
| Silica flour #219 | 2395 |
| Celite | 25 |
| Magnesium oxide (91%) | 80 |
| Total | 2500 |

Apparent density of filler, 1,289.

(b) The above binder solution of 850 ml. was added to the filler mixture while stirring. Apparent water/powder ratio, 34. After 1½ minute stirring the reaction takes place: A stiff dough is suddenly formed. After two (2) minutes stirring 300 ml. of a borax solution containing about 8 grams borax were added. Apparent water/powder ratio has now changed to .46.

Due to this change in the W/P ratio the dough quickly breaks down into a smooth creamy paste ready for pouring.

(c) Change of temperature during mixing and pouring: plus 9 centigrade. Final pH after pouring: pH7. Setting time: 60 minutes.

The investment thus produced dehydrates as well as the other investments, practically as well and as readily as the plaster of Paris investments. The above investment contains 26.2% water. The same dehydrated and calcined investment contains 2.9% phosphoric acid as phosphates, and 7.0% sodium chloride, or a total of about 11.8% salts acting as Binder.

EXAMPLE 16

A. The binder was prepared as follows:

600 ml. of the binder of Example 1 were diluted with 200 ml. water to make a total of 800 ml. Through this procedure the specific gravity of the binder solution of Example 1 changes from $s=1,168$ to $s=1,128$. 196 grams sodium chloride were dissolved in the above solution, that is, per 1 mol phosphoric acid 3.2 mol sodium chloride are used. The volume of the above solution was thus increased to about 875 ml. and the specific gravity of the binder solution changed from 1,128 to 1,248. This binder solution was now diluted with water to a specific gravity of 1,221 or to a total volume of 895 ml.—680 ml. of this binder contains a total of 78 grams phosphoric acid and 149 grams NaCl or 1.9 parts NaCl for one part phosphoric acid.

B. The investing slurry was produced with the above binder as follows:

*Filler*:

|  | Grams |
|---|---|
| Silica flour, 325 mesh | 1940 |
| Magnesium oxide, 91% MgO | 60 |
| Total | 2000 |

*Procedure.*—680 ml. of the above binder solution was added to the filler mixture while stirring. Water/powder ratio: 0.34. After 75 seconds stirring the reaction takes place. After the two-minute stirring period 240 ml. borax solution were added containing 6 grams borax. A beautiful, smooth slurry was thus formed. Final pH after pouring: 7. Setting time: 60 minutes.

After the usual dehydration and subsequent heating to about 1300° F. a very strong investment was formed, producing beautiful surfaces with iron alloys and other high melting alloys and metals.

EXAMPLE 17

The following three types of binder were made along the same lines as given in Example 1.

| 1 | 2 | 3 |
|---|---|---|
| 163 grams Zinc oxide. | 148 grs. Calcium-hydroxide. | 112 grs. Iron-fillings. |
| 500 ml. phosphoric acid, 85%. | 500 ml. phosphoric acid, 85%. | 500 ml. phosphoric acid, 85%. |
| 1500 ml. water. | 1500 ml. water. | 1500 ml. water. |

Each of these three solutions was of a similar type as solution A of Example 1. Each of these solutions contained the same equivalent of metal monophosphate (zinc, or calcium, or iron-monophosphate) and similar amounts of free phosphoric acid as the solution A of Example 1.

To each of these three solutions was added disodium phosphate solution in the same proportions as specified in Example 1, to form monosodium phosphate with the free phosphoric acid in same manner as specified in Example 1. After this procedure a binder solution was obtained containing about 41% of the total phosphoric acid content in the shape of a gel-forming metal-mono-phosphate, and 59% in the shape of monosodium phosphate ($NaH_2PO_4$).

These three binder solutions were modified as follows before using them for making the investment slurry:

|  | 1 Zinc | 2 Calcium | 3 Iron |
|---|---|---|---|
| Solution A—B ml | 500 | 500 | 500 |
| Water ml | 300 | 300 | 300 |
| Sodiumchloride grs | 150 | 150 | 150 |
| Total volume ml | 862 | 862 | 862 |

Each of these three binder solutions is reacted with the following filler and precipitator mixture:

|  | Grams |
|---|---|
| Silica flour, 325 mesh | 2440 |
| Magnesium oxide, 91% MgO | 60 |
| Total | 2500 |

For producing the final slurry and after the reaction has taken place in each of the three cases 300 ml. of a borax solution was added containing 7 grs. borax.

Reaction took place after:

8 minutes, with the zincphosphate binder,
1 minute, with the calciumphosphate binder,
4 minutes, with the ironphosphate binder.

pH after reaction: 6 (zinc), 4–5 (calcium), and 5–6 (iron).

pH after pouring: 7 (zinc), 6 (calcium), and 7 (iron).

Setting time:
78 minutes with zinc phosphate binder
6 hours with calcium phosphate binder
5 hours with ironphosphate binder.

With the above systems the setting time is substantially shortened by using less retarder (sodium chloride). It will be noted in the foregoing example that the zinc phosphate is similar in its properties to the magnesium phosphate gel although the magnesium phosphate gel is highly preferable. The iron and calcium phosphate gels are definitely inferior since they do not have the same absorption power as the magnesium phosphate gels. The calcium precipitator used for the precipitation of the calcium gel is best used in the form of calcium hydroxide since calcium oxide increases the temperature of the slurry and disturbs the gel system.

The foregoing examples illustrate the various modifications which can be used with a binder consisting preferably of a phosphate gel made from a solution containing magnesium and sodium monophosphates which is then mixed with a precipitant of magnesium oxide. Other monophosphates capable of producing insoluble secondary and tertiary phosphates can be used as illustrated in Example 23. Other alkali metal monophosphates such as potassium may be substituted for the sodium monophosphate. Any monophosphate which is able to form a gel structure under conditions similar to those described and exemplified hereinbefore may be used. Similarly, other metal oxides of the character hereinbefore set forth may be used as precipitators. As an alternative to the procedural steps given, the binder may be made in another manner than that shown in Example 1. Thus monophosphate powders may be combined with filler materials, and thereafter the mixture treated with water to produce a gel structure.

Further, wetting agents may be added to the investment slurry, or the wax patterns may be washed with liquids containing wetting agents. Tests have shown that wetting agents do not interfere with the form of the phosphate gel structure nor do they interfere with the absorption of water by the already formed gel structure during setting. In general the investment slurry of the present invention is particularly desirable for use in precision casting with high melting metals, since the refractories produced are of a non-reactive type at high temperatures. However, the investment slurry may be used as a coating material. In other words, the investment slurry of the present invention may be used as a first coating and in combination with ordinary plaster investments. Further, the new investment material may be utilized where the pattern is first coated with a water-glass/silica flour slurry. It has been found that the new phosphate gel investments adhere so well to the water-glass/silica flour films that cracking of the film does not take place.

In general it may be stated that the strongest refractories with a high degree of permeability are produced with the least amount of binder constituents and with fillers which have an apparent density sufficiently high to permit the manufacture of the slurry with a W/P ratio from about 0.30 to 0.50. This is particularly true when this slurry is initially produced from a rather stiff dough within a spatulation mixing period limited to about 3 minutes and when two of these three minutes are used for the formation of the phosphate gel structure and stiff dough. Slurries of this type always set within 25 to 45 minutes, and the investments are especially hard when set. Where the letter W occurs in the present specification, it is to be understood as an abbreviation for the volume of solution of binder salts in water, i. e. liquid, or in the alternative as the volume of solution which contains phosphoric acid in the form of phosphates in water. Thus, W/P ratio is intended to mean the water or solution/powder ratio. This term is generally used in dental plaster technique, wherein it designates the amount of solid or powder (plaster of Paris) used with a quantity of water to form a gel; although in connection with the present invention the gel is formed from salts dissolved in water, the volume of liquid which contains these salts is equally as important as the amount of liquid used with plaster in the prior art. Similarly, where $W/H_3PO_4$ ratio is used in the specification, it indicates the proportion of liquid to the amount of phosphoric acid which is used for producing the gel structures from the liquid phase.

Although the phosphate gel in accordance with the present invention is particularly suitable as a binder for refractory molding materials for the purpose hereinbefore set forth, the refractories produced utilizing the phosphate gel by itself or in admixture with suitable inorganic fillers can be used for other purposes where a temperature resistant material is desirable. For example, refractories of the type disclosed herein can be used as insulating materials. This is particularly true of the type of material produced in accordance with Example 20 which is comparatively light. Refractories in accordance with the present invention withstand a high degree of temperature and can be made dense or light and of varied mechanical strength. They may also be used in ordinary sand casting, for example, as binders or as surface improving materials. The present materials are also believed to be useful as catalysts in organic synthesis involving particularly vapor phase reactions at relatively high temperatures. It is desired to point out that phosphates are known catalysts for reactions of this type. By preparing the refractory structures in accordance with the present invention, the phosphates are during the formation of the refractory deposited on and in the refractory carrier structure. As pointed out in accordance with the present specification, this refractory structure may have a porous form and this type of structure is particularly advantageous for use as a catalyst.

I claim:

1. In a process for forming a refractory mold, the steps comprising preparing a solution of a primary alkali metal phosphate and a primary phosphate of a metal capable of forming insoluble secondary and tertiary phosphates, and mixing said solution with a metal oxide of a metal capable of forming insoluble tertiary and secondary phosphates in an amount at least sufficient to convert all phosphate present to tertiary phosphate, together with an inorganic mineral filler, from ⅓ to ⅔ of the total phosphoric acid content being present in said solution in the form of the second mentioned primary phosphate, and from ⅔ to ⅓ of the total phosphoric acid content of the solution being present in the form of primary alkali metal phosphate.

2. In a process for forming a refractory phosphate gel, the steps comprising forming a water solution of a primary alkali metal phosphate and a primary phosphate of a metal capable of forming insoluble secondary and tertiary phosphates, and mixing said solution with a metal oxide of a metal capable of forming insoluble tertiary and secondary phosphates in an amount at least sufficient to convert all phosphate present to tertiary phosphate, from ⅓ to ⅔ of the total phosphoric acid content of the solution being present as the second mentioned primary phosphate, and from ⅔ to ⅓ of the phosphoric acid content being present as alkali metal primary phosphate.

3. In a method of casting metals having a high melting point above approximately 1000° C., the steps comprising forming a refractory mold according to claim 1 having as its essential constituent a phosphate gel binder inert in the presence of said relatively high melting metal and a finely divided inorganic filler, and casting said molten metal in said mold.

4. In a process for forming a refractory phosphate gel, the steps comprising forming a solution of a primary alkali metal phosphate and a primary phosphate of a metal capable of forming insoluble secondary and tertiary phosphates, said solution having a pH value between 3 and 4 and from ⅓ to ⅔ of the total phosphoric acid content of said solution being in the form of the second mentioned primary phosphate, and from 2/3 to 1/3 of the total phosphoric acid content of the solution being present in the form of the primary alkali metal phosphate, and mixing said solution with a metal oxide of a metal capable of forming insoluble tertiary and secondary phosphates in an amount at least sufficient to convert all phosphate present to tertiary phosphate.

5. In a process for forming a refractory phosphate gel, the steps comprising forming a solution of primary alkali metal phosphate and primary magnesium phosphate, said solution having a pH value between pH 3 and pH 4, and from 1/3 to 2/3 of the total phosphoric acid content in such solution being present in the form of primary magnesium phosphate, and from 2/3 to 1/3 of the total phosphoric acid content of the solution being present in the form of primary alkali metal phosphate, and mixing said solution with magnesium oxide in an amount at least sufficient to convert all phosphate present to tertiary phosphate.

6. In a process for forming a refractory mold consisting of an inorganic mineral filler and phosphate gel binder, the steps comprising forming a solution of a primary alkali metal phosphate and a primary phosphate of a metal capable of forming insoluble secondary and tertiary phosphates, from 1/3 to 2/3 of the total phosphoric acid content present in said solution being in the form of the second mentioned primary phosphate, and from 2/3 to 1/3 of the total phosphoric acid content of the solution being present in the form of primary alkali metal phosphate, the total amount of phosphoric acid present varying from 3 to 8% of phosphoric acid based on the dry weight of the finished refractory, and mixing said solution with a metal oxide of a metal capable of forming insoluble tertiary and secondary phosphates, together with an inorganic mineral filler having an apparent density between approximately 1.35 and 1.75, said metal oxide being present in an amount at least sufficient to convert the phosphate present to tertiary phosphate.

7. In a process for forming a refractory phosphate gel, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, and the ratio of the water in milliliters and phosphoric acid present in grams varying between 6 and 12, and mixing said solution with a metal oxide of a metal capable of forming insoluble tertiary and secondary phosphates said metal oxide being present in an amount at least sufficient to convert the phosphate present to tertiary phosphate.

8. In a process for forming a refractory material consisting of a filler and a phosphate gel binder, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, said metal oxide being present in an amount at least sufficient to convert the phosphate present to tertiary phosphate.

9. In a process for forming a refractory material consisting of a filler and a phosphate gel binder, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate and from two-thirds to one-third of the phosphoric acid content being present as primary alkali metal phosphate, the total amount of phosphoric acid present varying from 3 to 8% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, said metal oxide being present in an amount at least sufficient to convert the phosphate present to tertiary phosphate.

10. In a process for forming a refractory material consisting of a filler and a phosphate gel binder, the steps comprising preparing a water solution of a primary alkali metal phosphate and magnesium phosphate, from one-third to two-thirds of the total phosphoric acid content of the solution being present as magnesium phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with magnesium oxide together with an inorganic mineral filler said magnesium oxide being present in an amount at least sufficient to convert the phosphate present to tertiary phosphate.

11. In a process for forming a refractory material consisting of a filler and a phosphate gel binder, the steps comprising preparing a water solution of a primary alkali metal phosphate and a primary phoshate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as a primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, the ratio of the water in milliliters to the total solids in grams present varying from 0.35 to 0.50 and said metal oxide being present in an amount at least sufficient to convert the phosphate present to tertiary phosphate.

12. In a process for forming a refractory material consisting of a filler and a phosphate gel binder, the steps comprising preparing a water solution of a primary alkali metal phosphate and a primary phoshate of a metal capable of forming insoluble secondary and tertiary phopshates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, the ratio of the water in milliliters to the total solids present in grams varying from 0.35 to approximately 3 and said metal oxide being present in an amount at least sufficient to convert the phosphate present to tertiary phosphate.

13. In a process for forming a refractory material consisting of a filler and a phosphate gel binder, the steps comprising preparing a water solution of a primary alkali metal phosphate and magnesium phosphate, from one-third to two-thirds of the total phosphoric acid content being present as magnesium phosphate, and from two-thirds to one-third of the phosphoric acid content being present as primary alkali metal phosphate, the total amount of phosphoric acid present varying from 2 to 8% phosphoric acid based on the weight of the dry refractory material formed and the ratio of the water in milliliters and phosphoric acid present in grams varying between 6 and 12, and mixing said solution with magnesium oxide together with an inorganic mineral filler having an apparent density from approximately 1.35 to 1.70, the ratio of solution to total solids present in the final mixture varying between 0.35 and 0.50 and the magnesium oxide being present in an amount at least sufficient to convert the phosphate present to tertiary phosphate.

14. In a process for forming a refractory material consisting of a filler and a phosphate gel binder, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, mixing said solution with a metal oxide of a metal capable of forming insoluble tertiary and secondary phosphates together with an inorganic mineral filler while slowly stirring the same and thereafter, after initial gel formation, adding an additional quantity of aqueous liquid, the ratio of water in milliliters to total solids present in grams in the final mixture varying between 0.35 and 0.50 said metal oxide being present in an amount at least sufficient to convert the phosphate present to tertiary phosphate.

15. In a process for forming a refractory material consisting of a filler and a phosphate gel binder, the steps comprising preparing a water solution of a primary alkali metal phosphate and magnesium phosphate, from one-third to two-thirds of the total phosphoric acid content being present as magnesium phosphate, and from two-thirds to one-third of the phosphoric acid content being present as primary alkali metal phosphate, the total amount of phosphoric acid present varying from 2 to 8% phosphoric acid based on the weight of the dry refractory gel formed and the ratio of the water in milliliters and phosphoric acid present in grams varying between 6 and 12, mixing said solution with magnesium oxide together with an inorganic mineral filler having an apparent density from approximately 1.35 to 1.70 while slowly stirring the same and thereafter, after initial gel formation, adding an additional quantity of aqueous liquid, the ratio of water in milliliters to the total solids present in grams in the final mixture varying between 0.35 and 0.50 said metal oxide being present in an amount at least sufficient to convert the phosphate present to tertiary phosphate.

16. In a process for forming a refractory phosphate gel, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the ratio of the water in milliliters and phosphoric acid present in grams varying between 6 and 12, and reacting said solution and metal oxide in the presence of a gel retarder comprising a soluble neutral salt of a strong mineral acid, said metal oxide being present in an amount at least sufficient to convert the phosphate present to tertiary phosphate.

17. In a process for forming a refractory phosphate gel, the steps comprising preparing a water solution of a primary alkali metal phosphate and a primary phosphate of a metal capable of forming insoluble secondry and tertiary phosphates, from one-third to two-thirds of the total phosphoric acid content of the solution being present as the second mentioned primary phosphate, and from two-thirds to one-third of the phosphoric acid content being present as primary alkali metal phosphate, the ratio of the water in milliliters and phosphoric acid present in grams varying between 6 and 12, and reacting said solution and metal oxide in the presence of a gel retarder comprising an alkali metal halide, said metal oxide being present in an amount at least sufficient to convert the phosphate present to tertiary phosphate.

18. In a process for forming a refractory phosphate gel, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the ratio of the water in milliliters and phosphoric acid present in grams varying between 6 and 12, and reacting said solution and metal oxide in the presence of a gel retarder comprising an alkali metal chloride, said metal oxide being present in an amount at least sufficient to convert the phosphate present to tertiary phosphate.

19. In a process for forming a refractory material consisting of a filler and a phosphate gel binder, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the ratio of the water in milliliters and phosphoric acid present in grams varying between 6 and 12, and reacting said solution and metal oxide in the presence of a gel retarder comprising an alkali metal chloride in an amount from 2 to 12% of the dry weight of the material, said metal oxide being present in an amount at least sufficient to convert the phosphate present to tertiary phosphate.

20. In a process for forming a refractory material consisting of a filler and a phosphate gel binder, the steps comprising preparing a water solution of a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the ratio of the water in milliliters and phosphoric acid present in grams varying between 6 and 12, and reacting said solution and metal oxide in the presence of a gel retarder comprising an alkali metal fluoride in an amount from about 0.2 to 2% of the dry weight of the material, said metal oxide being present in an amount at least sufficient to convert the phosphate present to tertiary phosphate.

21. In a process for forming a refractory material consisting of a filler and a phosphate gel binder, the steps comprising preparing a water solution of sodium chloride, a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, said metal oxide being present in an amount at least sufficient to convert the phosphate present to tertiary phosphate.

22. In a process for forming a refractory material consisting of a filler and a phosphate gel binder, the steps comprising preparing a water solution of sodium chloride, a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, and thereafter reacting said metal oxide and solution in the presence of up to 0.5% of the weight of said filler of borax, said metal oxide being present in an amount at least sufficient to convert the phosphate present to tertiary phosphate.

23. In a process for forming a refractory material consisting of a filler and a phosphate gel binder, the steps comprising preparing a water solution of sodium chloride, a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, and mixing said solution with a metal oxide of a metal capable of forming insoluble tertiary and secondary phosphates together with an inorganic mineral filler, and thereafter reacting said metal oxide and solution in the presence of a gel accelerator comprising a borax solution, said metal oxide being present in an amount at least sufficient to convert the phosphate present to tertiary phosphate.

24. In a process for forming a refractory material consisting of a filler and a phosphate gel binder, the steps comprising preparing a water solution of sodium chloride, a primary alkali metal phosphate and a primary phosphate of a metal capable of forming insoluble secondary and tertiary phosphates, from one-third to two-thirds of the total phosphoric acid content of the solution being present as the second mentioned primary phosphate, and from two-thirds to one-third of the phosphoric acid content being present as primary alkali metal phosphate, the total amount of phosphoric acid present varying from 2 to 25% of phosphoric acid based on the weight of the dry refractory material formed, and the ratio of the water in milliliters and phosphoric acid present in grams varying between 6 and 12, the quantity of sodium chloride present varying from 4 mols to 1 mol for each mol of phosphoric acid present, and mixing said solution with a metal oxide of a metal capable of forming insoluble tertiary and secondary phosphates together with an inorganic mineral filler, said metal oxide being present in an amount at least sufficient to convert the phosphate present to tertiary phosphate.

25. In a casting process including forming a dehydrated refractory mold in accordance with the process of claim 1 and including as a surface improving agent an alkali metal halide in the proportion of from 2 to 4 mols per mol of phosphoric acid based on the phosphoric acid present in the form of phosphate, the step which comprises heating the dehydrated mold to a temperature adjacent the fusion point of the alkali metal halide.

26. In a casting process including forming a dehydrated refractory mold in accordance with the process of claim 1 and including as a surface improving agent sodium chloride in the proportion of from 2 to 4 mols per mol of phosphoric acid based on the phosphoric acid present in the form of phosphate, the step which comprises heating the dehydrated mold to a temperature above 800° F. and thereafter casting molten metal in said mold.

27. A casting process comprising forming a refractory mold in accordance with the process of claim 1 and including as a surface improving agent an alkali metal halide in the proportion of from 2 to 4 mols per mol of phosphoric acid based on the phosphoric acid present in the form of phosphate, heating the mold to a temperature adjacent the fusion point of the alkali metal halide, cooling the mold to a temperature between 1100° F. and 800° F. and thereafter casting molten metal in the mold at said temperature.

JOHANN S. STREICHER.

REFERENCES CITED

The following references are of record in the file of this patent:

UNITED STATES PATENTS

| Number | Name | Date |
|---|---|---|
| 1,215,335 | Bosch et al. | Feb. 13, 1917 |
| 1,751,482 | Leasman | Mar. 25, 1930 |
| 2,072,212 | Moosdorf | Mar. 2, 1937 |
| 2,084,511 | Small | June 22, 1937 |
| 2,152,152 | Prosen | Mar. 28, 1939 |
| 2,209,035 | Prosen | July 23, 1940 |
| 2,322,638 | Kleeman | June 22, 1943 |
| 2,372,236 | Wainer | Mar. 27, 1945 |
| 2,388,299 | Thielemann | Nov. 6, 1945 |
| 2,435,196 | Bond | Feb. 3, 1948 |
| 2,442,319 | Britton | May 25, 1948 |
| 2,442,320 | Britton | May 25, 1948 |

FOREIGN PATENTS

| Number | Country | Date |
|---|---|---|
| 233,907 | Great Britain | May 21, 1925 |